United States Patent
Medvedev

(10) Patent No.: US 6,390,414 B1
(45) Date of Patent: May 21, 2002

(54) SELF-ADJUSTING AIR INTAKE

(76) Inventor: Vladimir Timofeevich Medvedev, ul. Komitetsky les, 10-26, pos. Bolshevo7, Moskovskaya obl. (RU), 141090

( * ) Notice: Subject to any disclaimer, the term of this patent is extended or adjusted under 35 U.S.C. 154(b) by 0 days.

(21) Appl. No.: 09/582,572
(22) PCT Filed: Dec. 29, 1998
(86) PCT No.: PCT/RU98/00443
§ 371 Date: Jun. 27, 2000
§ 102(e) Date: Jun. 27, 2000
(87) PCT Pub. No.: WO99/33701
PCT Pub. Date: Jul. 8, 1999

(30) Foreign Application Priority Data

Dec. 29, 1997 (RU) .......................................... 97121837

(51) Int. Cl.[7] ............................................. B64D 29/04
(52) U.S. Cl. ................................................. 244/53 B
(58) Field of Search ................... 244/53 B, 53 A; 137/15.1, 15.2

(56) References Cited

U.S. PATENT DOCUMENTS

| | | | | |
|---|---|---|---|---|
| 3,430,640 A | * | 3/1969 | Lennard | 137/15.1 |
| 3,778,983 A | * | 12/1973 | Rygg | 55/306 |
| 4,307,743 A | * | 12/1981 | Dunn | 137/15.1 |
| 4,372,505 A | * | 2/1983 | Syberg | 244/53 B |
| 5,337,975 A | * | 8/1994 | Peinemann | 244/53 B |

* cited by examiner

*Primary Examiner*—Michael J. Carone
*Assistant Examiner*—Timothy D. Collins
(74) *Attorney, Agent, or Firm*—Robert J. Van Der Wall

(57) ABSTRACT

The present invention increases the recovery ratio of air intake (AI) as the supersonic flight speed increases, by preventing the penetration of a non-decelerated flow into the channel. In a subsonic regime, all the tiltable panels (5, 8, 20 and 11, 12, 21) are located in a uniform flow and operate as vanes. The partitions serve as a guiding apparatus. In a supersonic regime, the pressure at the outer side of panels 5, 8, 20, which are adjacent to the profile of an expanding channel, is decreased. This decrease in pressure contributes to the panel rotation as the pressure increases in the boundary layer (b.l.) when the AI is throttled, wherein this pressure can be transmitted via a special channel 22. When the panels 11, 12, 21 are at the boundary of zones with different pressures, they are turned thereby forming an aerodynamically efficient shape of a subsonic channel. Slots 15, 16 are used for the boundary-layer bleeding, for transmitting pressure to panels 5, 8, and for the additional feeding of slots 17, 18 for blowing air into the boundary layer. In case of a weak throttling and when the terminal shock is in a distant zone, all the panels are located in an almost uniform supersonic flow in the vane position. When the throttling causes the expulsion of the normal shock beyond the entry plane, all the tiltable panels are in a subsonic flow and also take up the positions of vanes, thereby preparing the throat to the start of AI during the reduction thereof.

17 Claims, 6 Drawing Sheets

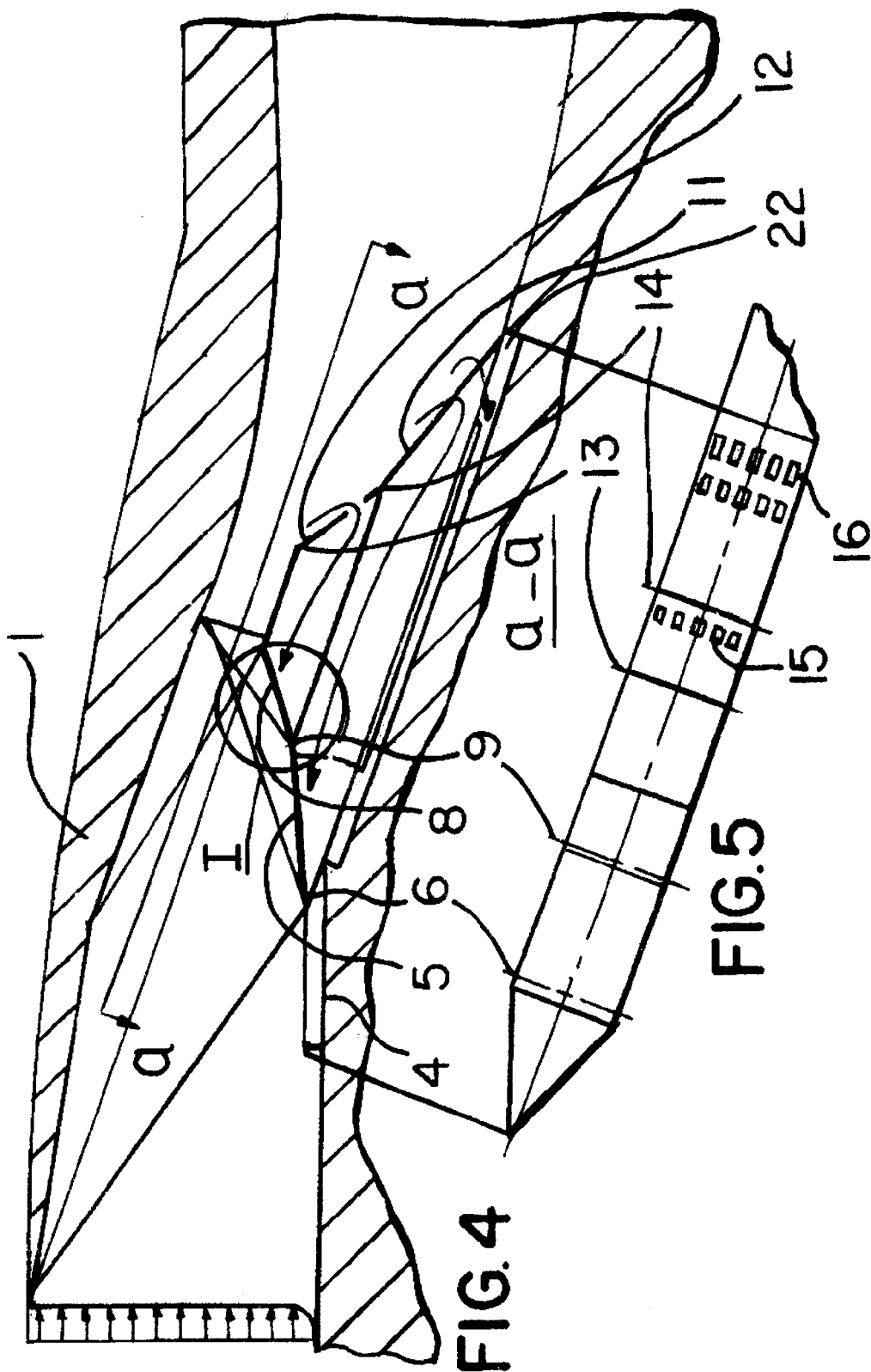

SELF-ADJUSTING AIR INTAKE

BACKGROUND OF THE INVENTION

1. Field of the Invention

The present invention relates to the field of aviation technology, particularly, to the structure of air intakes designed for air-jet engines of supersonic flying vehicles with an expanded speed range.

2. Description of the Prior Art

An air intake is known which comprises a supersonic zone with a flat surface of supersonic flow braking, this surface being adjacent to the fuselage surface via a boundary layer deflector, a throat, and a subsonic zone, as, for example, in a Russian aircraft SU-27 (Technical Information of the TsAGI (Tsentralni Aero-Gidrodinamicheski Institut, Institute of Aeronautical Research) "News of Foreign Science and Technology", Issue 2–3, 1994). In a subsonic flight regime, the air intake throat should be expanded, and in a supersonic regime it should be converged. The channel geometry is changed with a complex automatic control system comprising, in particular, a drive for movable panels of the air intake. To provide for aerodynamic stability of the air-jet engine, the field of the air flow which is formed by the air intake should be sufficiently uniform.

With this object in view, an attempt is usually made to construct the air intake channel containing no curves where centrifugal forces can be generated. As a result, the structure becomes more complex. For example, the power installation of the flying vehicle nose becomes raised above the horizontal plane. The designed supersonic regime of such an air intake is characterized by the fact that the supersonic flow shocks are on the front edge of the cowl, the air flow rate ratio is approximately equal to 1.0, and the drag is minimal.

When the Mach number of the incoming flow is less than a designed one, the shock inclination is decreased, a portion of the flow passes into a free space, the entrapped small jet of air has a cross section area which is less than that of the entry, and the air intake drag is increased. When the Mach number of the incoming flow is greater than the designed one, the shocks pass inside, the cross section air of the small decelerated jet becomes less than the entry surface area, and a portion of a non-decelerated flow passes into the air intake, this portion increasing with the increase in the excess of the flow speed over the designed one. The recovery ratio of the full pressure of the air intake is decreased accordingly.

The optimum degree of compression (the so-called external compression) of the flow in front of the entry whose boundary is beyond the front edge of the cowl is determined by comparing a gain obtained due to the increase in the recovery ratio and a loss caused by the increase in the wave drag of the cowl whose profile matches the current surface of the inner field. For this reason such air intakes are used at a Mach number of up to 2.2 . . . 2.5. A mixed (internal+ external) compression is employed for greater Mach numbers. However, since the maximum degree of internal compression, that is, the relative channel convergence, is determined by the condition that the air intake will be started at a minimum Mach number from the rate of operating conditions, this degree is also rather small and it is usually increased by using a structurally complex forcible control of air intake.

The known side intake which is selected as a prototype (Patent of Russian Federation No. 2078717) comprises a supersonic braking surface placed outside into a free incoming flow having no boundary layer, this surface turning the flow toward the fuselage, thereby making it shorter and lighter. The air intake cowl is located behind the fuselage boundary layer deflector. As a result, the above-mentioned limitations relating to the increase in the wave drag on the cowl are lifted. If such an intake has a folded structure, the degree of internal compression can be increased by starting the air intake during its opening, in addition to resolving the extraneous problem of decreasing the size of the propulsion system in a transportation position.

The drawback of such air intakes, which reduces its efficiency and reliability, especially, in a regime with Mach numbers less than the designed ones, is that they have a small range and degraded characteristics in an off-design regime and lack auto start in case of accidental stall at low Mach numbers. The restart requires the installation of a servo system with a braking surface drive that, as any complex system, has low reliability and a nonzero actuation time.

SUMMARY OF THE INVENTION

It is a technological object of the present invention to increase the efficiency and reliability of supersonic air intake operation in an expanded flight speed range by increasing the flow rate and full pressure recovery ratios, decreasing the drag, and providing for auto start in case of accidental stalls in the whole range of operation Mach numbers.

In order to attain this object, it is suggested to modify the structure of an air intake comprising a supersonic zone with an optionally tiltable braking surface, a throat, and a subsonic zone by introducing at least one additional air flow channel close to the main air flow channel and installing an additional surface (panel) at the entry of this additional air flow channel, which is located in the supersonic zone, this additional surface being free to turn around an upstream rotation axis located at the channel side which is far from the intake cross section center.

At the exit of the additional channel, which is located in the subsonic zone, there can be installed a check valve in the form of another tiltable panel improving the aerodynamics of the subsonic channel and having through slots for transmitting the increased pressure to the first panel and boundary-layer bleeding.

The additional braking panel can close the exit into the additional channel in a non-airtight manner so that the slots form a nozzle for blowing air into the boundary layer in order to implement the conventional method for boundary layer control.

In order to increase the degree of freedom in designing an air intake by affecting the turning of the additional panel located in the supersonic zone and thereby affecting the air intake characteristics in a transition period, the rear surface of the additional panel can rest on the exit of a special channel whose entry is located in one or another portion of the subsonic zone with a positive pressure gradient.

In order to air-tight seal the lateral slots between the movable additional panel and stationary side webs of the air intake, a gasket can he installed at the side end faces of the movable panel. The gasket is pressed to the side wall as the air pressure increases and can be in the form of an expandable pipe having orifices for pumping which are located in the increased pressure zone at the rear side of the additional braking panel.

In case of a minimum Mach number from the range of operation regimes, the additional panel is in the lowered position owing to the increased pressure of a flow that was turned around on the opposite surface. In this position, the additional panel opens the entry of the additional channel, thereby expanding the intake throat to the size corresponding to the lower value of the Mach number. As the flying vehicle is accelerated, the shocks increase their inclination and get off the additional braking surface, thereby freeing it from the increased pressure from the outer side (a zone of the expanding supersonic Prandtl-Meier flow with a reduced static pressure is formed thereon). In this case, the additional panel takes, according to the designer selection, either a position along the flow lines or that of a wedge braking a free incoming flow, under the effect of an optional spring and the increased pressure transmitted via the boundary layer which is evolving to a separation stage and/or via an optional special channel from the increased pressure zone of the subsonic channel (as the throttling of the air intake creates the respective counterpressure). As this takes place, the additional panel closes the entry of the additional channel for the non-decelerated flow, thereby reducing the throat size to a level corresponding to a greater value of the Mach number and serving as a check valve preventing the outflow of air from the increased pressure zone. When a wider range of Mach numbers is employed, several additional channels can be formed. In this case, however, care should be exercised to see that the surface area of the throat corresponding to lower Mach numbers provides for start.

Thus, the air intake efficiency increases owing to the increase in the degree of internal compression and, therefore, in the full pressure recovery ratio, and also because the "designed" Mach number of the air intake is not a single Mach number usually selected in the middle of the operation range, but a set of Mach numbers starting from the minimum Mach number, which results in the entrapped air jet always having a surface area equal to the entry surface area in this range and, consequently, having no flow drag.

The increase in the air intake reliability can be explained as follows. If the counterpressure behind the throat is accidentally increased, thereby causing the separation of flow accompanied by the expulsion of the normal shock beyond the inlet plane, the tiltable additional brake surface and the additional counterpressure valve, provided it is installed, start to operate as vanes, should they be brought into the uniform subsonic flow, and completely open the additional throat and prepare the throat for the restart of the air intake upon the release of the increased counterpressure. This allows the surge margin to be reduced and enables a safe operation in a higher point of the throttle characteristic of the air intake.

The comparison with the prototype demonstrates that the apparatus in accordance with the present invention is characterized by the fact that it has at least one additional channel with its own tiltable brake surface at the entry and, optionally, a counterpressure valve at the exit which automatically change the configuration of the flow channel of the air intake according to the current Mach number of the flight and the counterpressure value in the subsonic channel.

Therefore, a conclusion can be made that the claimed technical resolution of the problem of braking a supersonic air flow with a minimum loss of full pressure, flow rate, and external resistance within a wide range of supersonic Mach numbers conforms to the "novelty" criterion. A straightforward approach to the resolution of this problem in similar air intakes based on a forcible control (included in an automatic engine control system) of the panels of the main braking surface is structurally more complex, involves the usage of a large amount of materials, and results in a slower response than the claimed one. This suggests that the claimed technical solution is nonobvious, and a conclusion can be made that it conforms to the "inventiveness" criterion.

BRIEF DESCRIPTION OF THE DRAWINGS

The "utility" of the present invention is illustrated by the figures attached.

FIG. 4 additionally shows an optional channel for transmitting the increased pressure from the subsonic zone to the upstream supersonic tiltable panel.

FIGS. 5 and 6 show cross sections illustrating the structure of additional tiltable braking panels comprising slots for blowing air into the boundary layer and the structure of subsonic counterpressure valves, which are the panels comprising slots for transmitting the increased pressure to the upstream panel and boundary-layer bleeding.

DETAILED DESCRIPTION OF PREFERRED EMBODIMENTS

Figure 1:
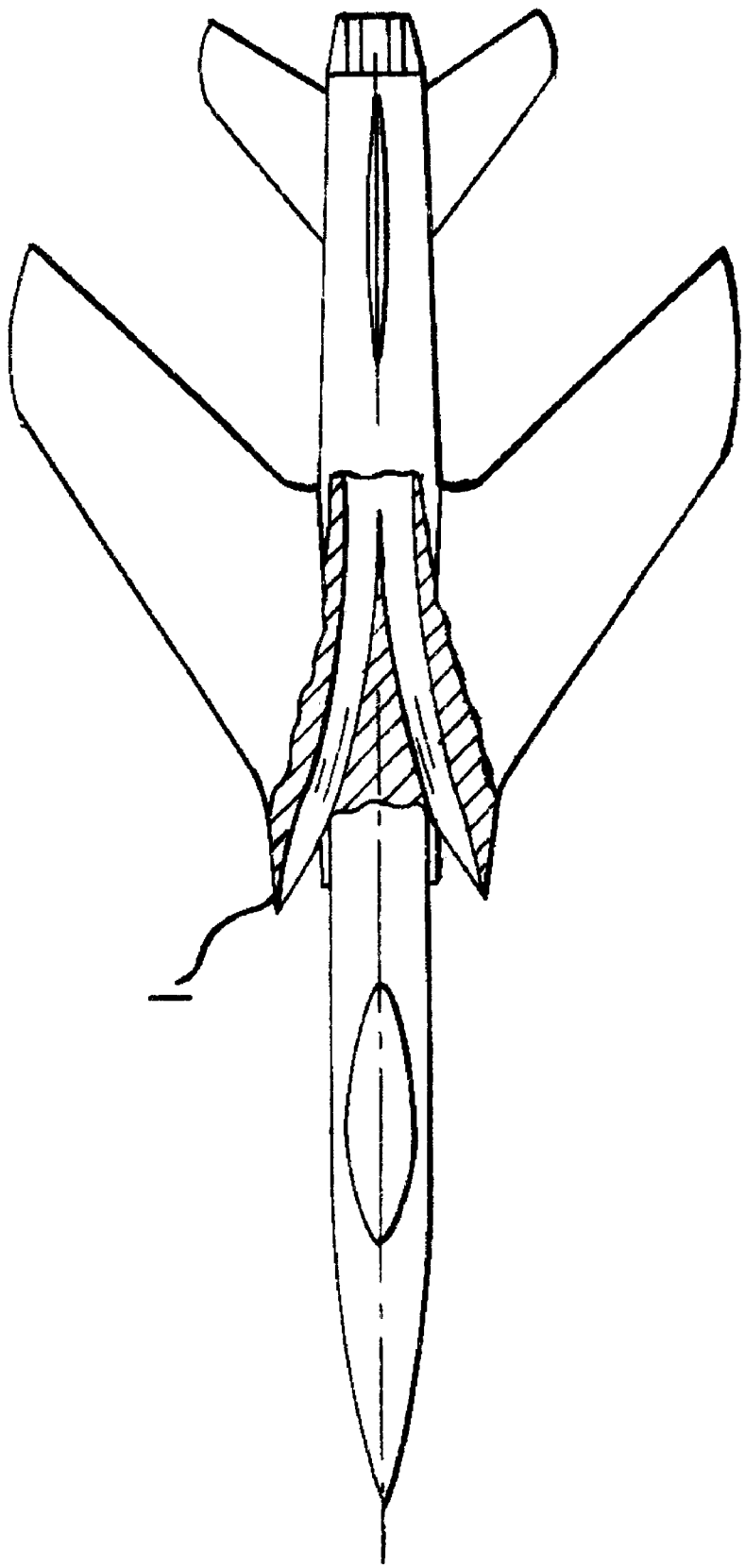
FIG. 1 is a general view illustrating the possible installation of the air intake in accordance with the present invention on a flying vehicle.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various figures are designated by the same reference numerals.

The self-adjustable air intake comprises a braking surface (1) optionally constructed so as to be free to turn around the rotation axis (2) and comprising boundary-layer bleed slots (3) crossing the rotation nodes, a deflector (4) for the nose boundary layer, a first additional braking surface (panel) (5) with a rotation axis and a spring (6) thereon, this surface (5) being installed at the entry of a first additional channel (7), a second additional tiltable braking surface (panel) (8) with a rotation axis and a spring (9), this surface (8) being installed at the entry of a second additional channel (10), additional counter-pressure valves (11) and (12) of a subsonic zone with respective rotation axis (13) and (14) and slots (15) and (16), and boundary-layer blow-in slots (17) and (18). The air intake may also contain an additional channel (19) to provide for adjustment in a wider range of Mach numbers. It is located on the other side of the cross section, and has its own tiltable panel (20) for braking a supersonic flow, a tiltable panel (21) in a subsonic zone and, optionally, a special channel (22) for air supply to the tiltable panel at the increased pressure entry from the subsonic flow zone. The panel (20), in its opened position, is adjacent to the surface of the expanding channel. The slots for a high-pressure air intake are located in a wider zone of the subsonic channel, this zone being farther than the zones where the slots are installed in the first two additional channels.

The self-adjustable air intake operates in the following manner.

Figure 2:
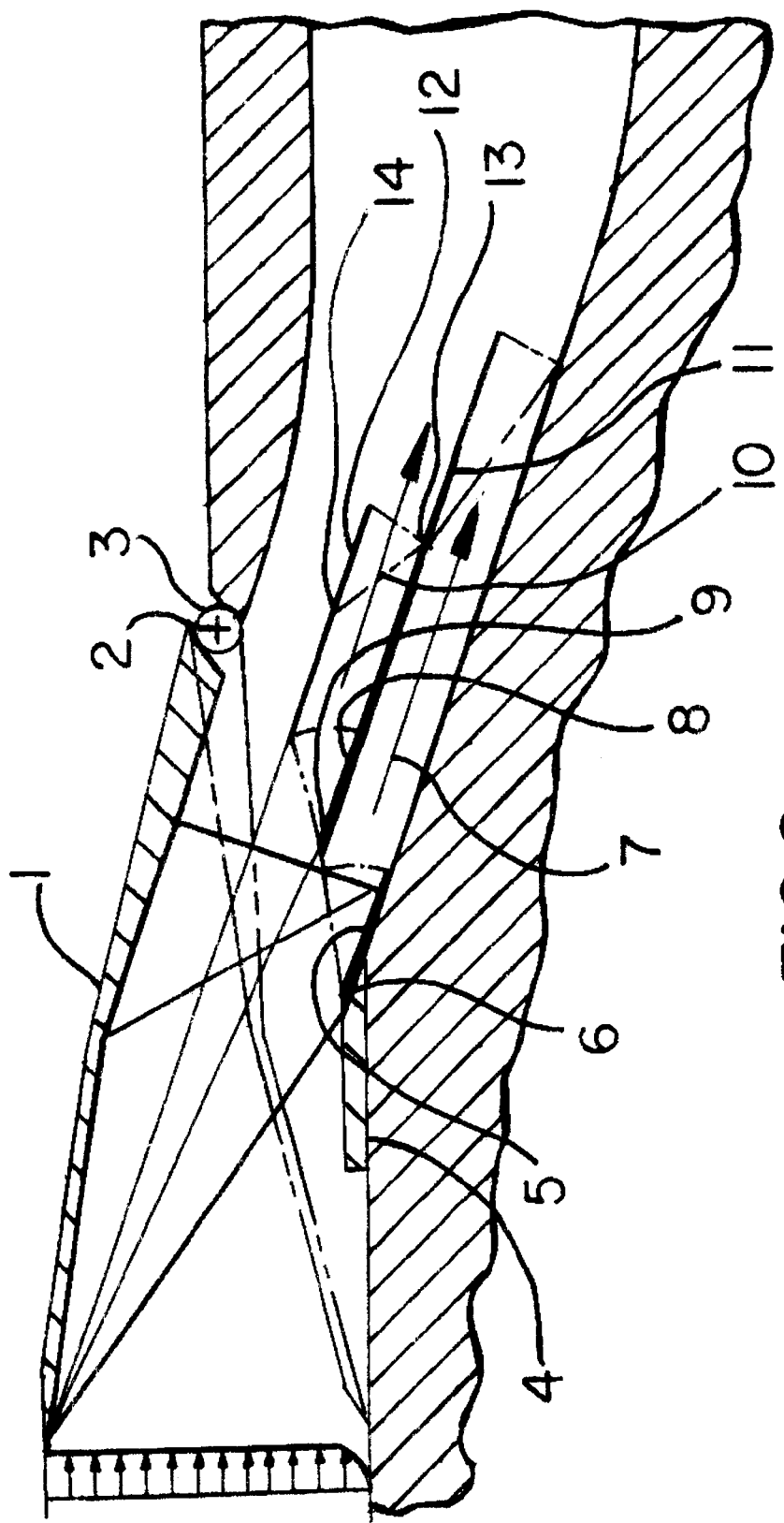
FIG. 2 shows an air intake wherein the shocks and panel position relate to a flight with M=2 and a correlation is provided with the point on the throttle characteristic of the propulsion system, which corresponds to the maximum value of recovery and flow rate ratios (the dot-and-dash line illustrates an embodiment in which the main braking surface is in a folded position as in the air intake selected as a prototype. Its capability to start the air intake during opening thereof can be useful when the passage section is jammed by the partitions of the additional channels).
Figure 3:
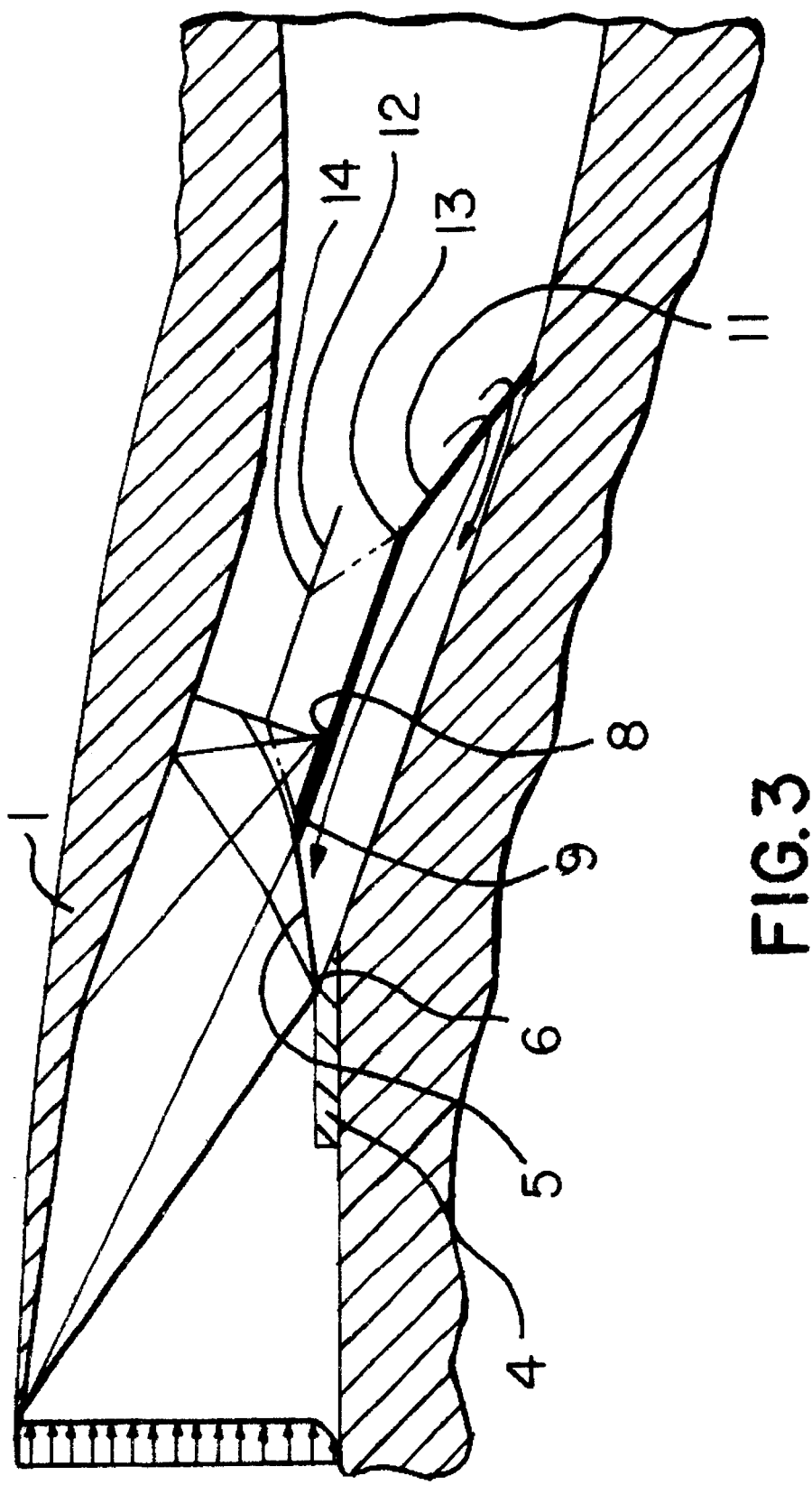
FIG. 3 relates to the flight regime with M=3, and FIG. 4 to a flight regime with M=4.
Figure 6:
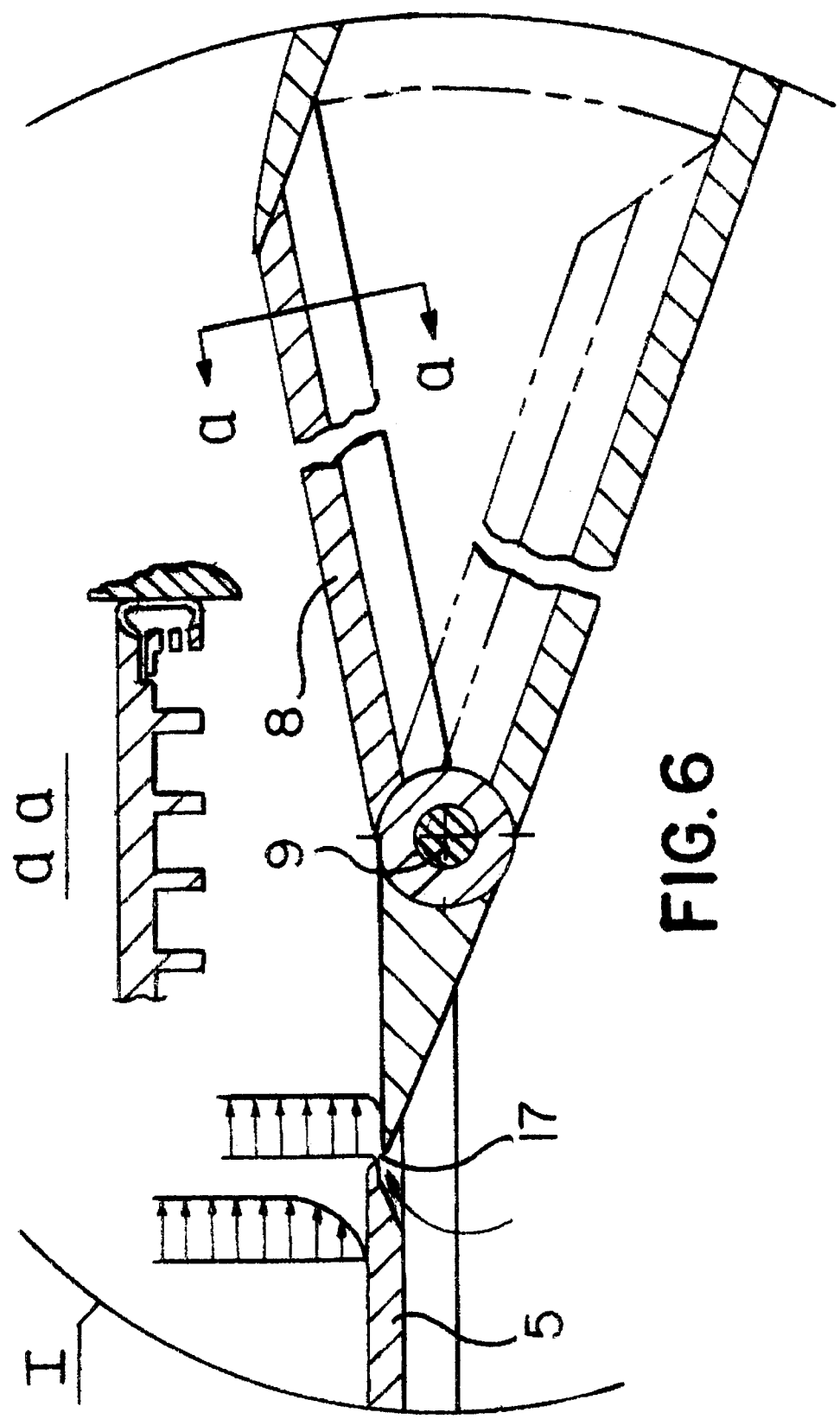
Figure 7:
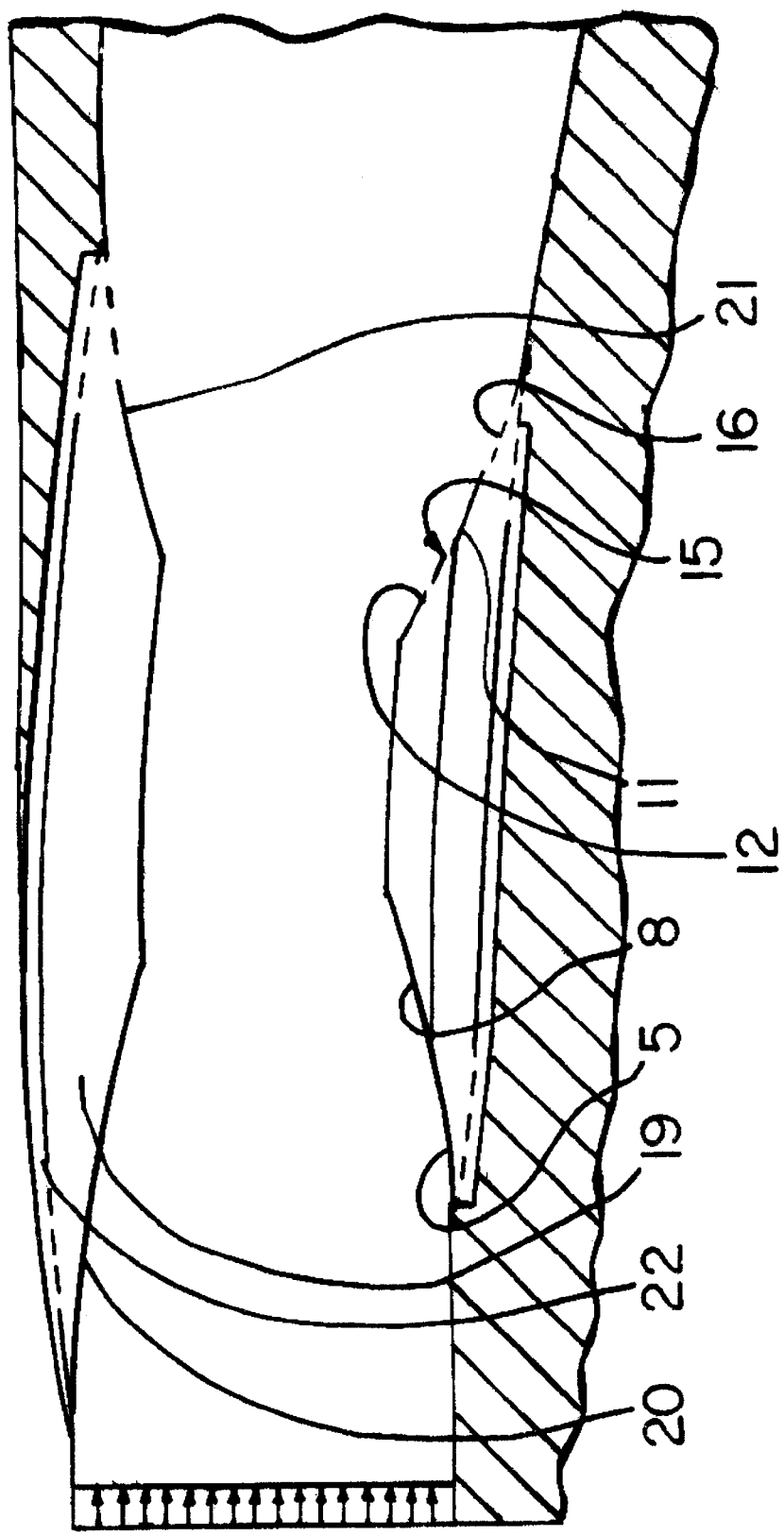
FIG. 7 shows a self-adjustable air intake comprising additional channels on both sides of its cross section center.

In a subsonic regime of an aircraft flight (FIG. 1), all the tiltable panels (5), (8), (11), (12), (20), and (21) are in a uniform flow and operate as vanes, taking up the positions shown in FIG. 2 (except panels (20) and (21) which are shown in FIG. 7 in the position corresponding to the maximum speed of a supersonic flow and a maximum degree of air intake throttling). The partitions in the additional channels serve as guide blades for the flow which turns toward the engine. With the air intake of the first embodiment, this configuration is maintained till the flying vehicle enters the supersonic regime in which the shocks that are the boundaries of the increased pressure zones separate from the first additional braking surface, while increasing their inclination with the increase in Mach number. In this case, under the effect of the spring and the increased static pressure transmitted through the channel (22), provided that it is constructed, via the boundary layer and a stall behind a step created by the horizontal panel from the decelerated subsonic flow zone, the first additional braking panel (5) takes up a position shown in FIG. 3, in which it closes the entry of the first additional channel (7). As this takes place, since the counter-pressure valve (11) is located at the boundary of zones with different pressures, it sinks to the lower position, thereby creating an aerodynamically efficient shape of the subsonic portion of the main channel of the air intake. Slots (16) serve for transmitting the increased pressure to the rear side of the first braking panel, additionally feeding the slot (17) for blowing air into the boundary layer, and also for bleeding the boundary layer which grows on the upstream external panel. Their size is determined by the rate of air flow through the slots (17). The tiltable braking panel (5) is reliably maintained in the upper position because its rear side is under the effect of pressure applied by the flow decelerated to a subsonic rate, and its outer side is, at maximum, under the effect of a static pressure of the supersonic flow behind the oblique shock, which is much lower than the aforesaid pressure. As the flight speed further increases, the shocks from the main braking surface also leave the second additional braking panel (8), and the process of air intake adjustment to a greater Mach number is continued with the second additional channel (FIG. 4). In another embodiment of the air intake, the process of adjustment to a supersonic regime also starts with the decrease in static pressure which accompanies the transition from the subsonic flight speed to the supersonic flight speed in the expanding entry portion of the air intake channel. This process is similar to the pressure drop occurring when shocks separate from the first additional panel (5) as the Mach number increases at the external part thereof. This aids in transferring the panel (20), as well as panel (5), into another position, thereby closing the entry of its additional channel and taking up the position of a wedge decelerating the free incoming flow which is directed by the panel toward the tiltable panel of the opposite additional channel. The adjustment is further conducted in the above-described manner. This panel is overturned during acceleration before other panels and maintains the overturned position in regimes with high Mach numbers and a high degree of air intake throttling since it is fed from a farther and wider zone of the subsonic channel where the highest static pressure is created. As the counterpressure is released, for example, during the transition into a passive flight regime, when the rear shock goes downstream beyond the region where the slots (15) and (16) are located, the panels (5), (8) and valves (11), (12) are brought into an almost uniform flow and take up the position of vanes similar to that shown in FIG. 2.

In case of accidental increase in counterpressure which pushes the normal shock beyond the air intake, toward the flow, all the tiltable panels are in a uniform, this time subsonic flow and again take up the positions of vanes, thereby preparing the throat for the start of the air intake when the accidental increase in counterpressure is released.

The present invention makes it possible to employ an internal compression air intake, which has some advantages in tennis of full pressure recovery (J. Allen et al. Aerodynamics of Rockets, ed. M. Hemsh, v. 1, chapter 4, Moscow, Mir Publishing House, 1989), in a very wide range of air flow rates. At the same time, such a capability of self-adjustment to the current Mach number and counterpressure behind the throat makes it possible to simplify the engine control system and also to increase its speed of response and reliability. The increase of the full pressure recovery ratio at high speeds also enables the construction of an air intake with a smaller entry area, thereby producing a positive effect on the decrease in volume, weight, and drag of the flying vehicle.

Industrial Utility

The experimental study conducted at an incoming flow rate corresponding to a Mach number of 3.0 shows that the transition from a supersonic air intake model with a relative throat area of 0.55 (designed Mach number is 2.2) to a model with a relative throat area of 0.369 (designed Mach number is 3.0) results in a 40% increase in the critical full pressure recovery ratio.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A supersonic air intake comprising a supersonic zone, a throat, and a subsonic zone, characterized by the fact that in order to self-adjust the geometry of these zones to the current speed of incoming flow and counterpressure value, the air intake comprises at least one additional channel connecting the supersonic zone to the subsonic zone, and having at its entry located in the supersonic zone a tiltable panel rotated by aerodynamic forces with an upstream rotation axis which is installed at the side which is far from the intake cross section center.

2. The air intake as described in claim 1, characterized by the fact that in the configuration in which the tiltable panel shuts the entry of the additional channel, there is a non-air-tightness in the form of a slot forming a nozzle for blowing air into a boundary layer.

3. The air intake as described in claim 1, characterized by the fact that in order to air-tight seal the lateral slots between the tiltable panel and side walls, the air intake comprises a gasket sealing those slots by means of air increased pressure generated at the rear side of the tiltable panel.

4. The air intake as described in claim 2, characterized by the fact that in order to air-tight seal the lateral slots between the tiltable panel and side walls, the air intake comprises a gasket sealing those slots by means of air increased pressure generated at the rear side of the tiltable panel.

5. The air intake as described in claim 1, characterized by the fact that at the additional channel exit located in the subsonic zone, there is another tiltable panel with an upstream rotation axis, installed on the air intake side which is closest to the center of its cross section, this panel being provided with through openings for a boundary-layer bleeding and transmission of increased pressure to the tiltable panel located at the entry.

6. The air intake as described in claim 2, characterized by the fact that at the additional channel exit located in the subsonic zone, there is another tiltable panel with an upstream rotation axis, installed on the air intake side which is closest to the center of its cross section, this panel being provided with through openings for a boundary-layer bleeding and transmission of increased pressure to the tiltable panel located at the entry.

7. The air intake as described in claim 3, characterized by the fact that at the additional channel exit located in the subsonic zone, there is another tiltable panel with an upstream rotation axis, installed on the air intake side which is closest to the center of its cross section, this panel being provided with through openings for a boundary-layer bleeding and transmission of increased pressure to the tiltable panel located at the entry.

8. The air intake as described in claim 1, characterized by the fact that, in order to transmit the increased pressure to the tiltable panel located at the entry, the air intake comprises a special channel whose entry is located in the subsonic zone.

9. The air intake as described in claim 2, characterized by the fact that, in order to transmit the increased pressure to the tiltable panel located at the entry, the air intake comprises a special channel whose entry is located in the subsonic zone.

10. The air intake as described in claim 3, characterized by the fact that, in order to transmit the increased pressure to the tiltable panel located at the entry, the air intake comprises a special channel whose entry is located in the subsonic zone.

11. The air intake as described in claim 5, characterized by the fact that, in order to transmit the increased pressure to the tiltable panel located at the entry, the air intake comprises a special channel whose entry is located in the subsonic zone.

12. A supersonic air intake comprising a supersonic zone, a throat, and a subsonic zone, characterized by the fact that in order to increase the operation efficiency and reliability by means of self-adjustment of the channel portion to the current speed of incoming flow and counterpressure value, the air intake comprises at least one additional channel connecting the supersonic zone to the subsonic zone, and having at its entry located in the supersonic zone a tiltable panel with an upstream rotation axis which is installed at the side which is far from the intake cross section center, further characterized by the fact that in the configuration in which the tiltable panel shuts the entry of the additional channel, there is a non-air-tightness in the form of a slot forming a nozzle for blowing air into a boundary layer, further characterized by the fact that with the aim of air-tight sealing the lateral slots between the tiltable panel and side walls, the air intake comprises a gasket sealing those slots by means of air increased pressure generated at the rear side of the tiltable panel, further characterized by the fact that at the additional channel exit located in the subsonic zone, there is another tiltable panel with an upstream rotation axis, installed on the air intake side which is closest to the center of its cross section, this panel being provided with through openings for a boundary-layer bleeding and transmission of increased pressure to the tiltable panel located at the entry, and finally characterized by the fact that, with an aim of transmitting the increase pressure to the tiltable panel located at the entry, the air intake comprises a special channel whose entry is located in the subsonic zone.

13. A supersonic air intake comprising a supersonic zone, a throat, and a subsonic zone, characterized by the fact that in order to increase the operation efficiency and reliability by means of self-adjustment of the channel portion to the current speed of incoming flow and counterpressure value, the air intake comprises at least one additional channel connecting the supersonic zone to the subsonic zone, and having at its entry located in the supersonic zone a tiltable panel with an upstream rotation axis which is installed at the side which is far from the intake cross section center, and which is further characterized by the fact that when the tiltable panel shuts the entry of the additional channel, there is a non-air-tightness in the form of a slot forming a nozzle for blowing air into a boundary layer.

14. The air intake as described in claim 13, characterized by the fact that in order to air-tight seal the lateral slots between the tiltable panel and side walls, the air intake comprises a gasket sealing those slots by means of air increased pressure generated at the rear side of the tiltable panel.

15. The air intake as described in claim 13, characterized by the fact that at the additional channel exit located in the subsonic zone, there is another tiltable panel with an upstream rotation axis, installed on the air intake side which is closest to the center of its cross section, this panel being provided with through openings for a boundary-layer bleeding and transmission of increased pressure to the tiltable panel located at the entry.

16. The air intake as described in claim 14, characterized by the fact that at the additional channel exit located in the subsonic zone, there is another tiltable panel with an upstream rotation axis, installed on the air intake side which is closest to the center of its cross section, this panel being provided with through openings for a boundary-layer bleeding and transmission of increased pressure to the tiltable panel located at the entry.

17. The air intake as described in claim 13, characterized by the fact that, in order to transmit the increased pressure to the tiltable panel located at the entry, the air intake comprises a special channel whose entry is located in the subsonic zone.

* * * * *